(12) United States Patent
Holmer

(10) Patent No.: US 6,346,138 B1
(45) Date of Patent: Feb. 12, 2002

(54) PURIFICATION OF HEXAFLUOROETHANE

(75) Inventor: Arthur Edward Holmer, Lewiston, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/387,756

(22) Filed: Sep. 1, 1999

(51) Int. Cl.⁷ .............................................. B01D 53/04
(52) U.S. Cl. ........................ 95/118; 95/143; 95/148; 95/287; 96/132; 96/133; 96/135
(58) Field of Search ................... 95/116–126, 141–143, 95/147, 148; 96/130–135, 143, 144

(56) References Cited

U.S. PATENT DOCUMENTS

| | | | | |
|---|---|---|---|---|
| 3,252,270 A | * | 5/1966 | Pall et al. ...................... | 95/143 |
| 3,660,967 A | * | 5/1972 | Collins et al. ............. | 95/141 X |
| 3,802,160 A | * | 4/1974 | Foltz ............................ | 55/187 |
| 3,972,694 A | * | 8/1976 | Head ............................. | 55/97 |
| 3,997,303 A | * | 12/1976 | Newton ......................... | 55/97 |
| 4,323,372 A | * | 4/1982 | Bentz et al. .................. | 95/141 |
| 4,770,678 A | * | 9/1988 | Haslett, Jr. ................ | 96/131 X |
| 4,826,497 A | * | 5/1989 | Marcus et al. ............. | 604/359 |
| 4,881,953 A | * | 11/1989 | Prasad et al. .................. | 55/16 |
| 4,934,148 A | * | 6/1990 | Prasad et al. .................. | 62/24 |
| 5,092,911 A | * | 3/1992 | Williams et al. .............. | 95/117 |
| 5,800,597 A | * | 9/1998 | Perrotta et al. ................... | 96/9 |
| 5,922,105 A | * | 7/1999 | Fujii et al. ................ | 95/118 X |
| 6,017,382 A | * | 1/2000 | Ji et al. ..................... | 95/142 X |
| 6,074,459 A | * | 6/2000 | Gingrich et al. ............. | 95/118 |

* cited by examiner

Primary Examiner—Robert H. Spitzer
(74) Attorney, Agent, or Firm—Bernard Lau

(57) ABSTRACT

This invention is directed to a method and system for purifying hexafluoroethane near its critical temperature and pressure, particularly where the hexafluoroethane contains at least about 1 ppb by weight of a non-volatile residue. A combination of a sand trap, an adsorption assembly made of a glass wool-molecular sieve-glass wool combination, and a filter is used.

18 Claims, 1 Drawing Sheet

PURIFICATION OF HEXAFLUOROETHANE

FIELD OF THE INVENTION

Figure 1:
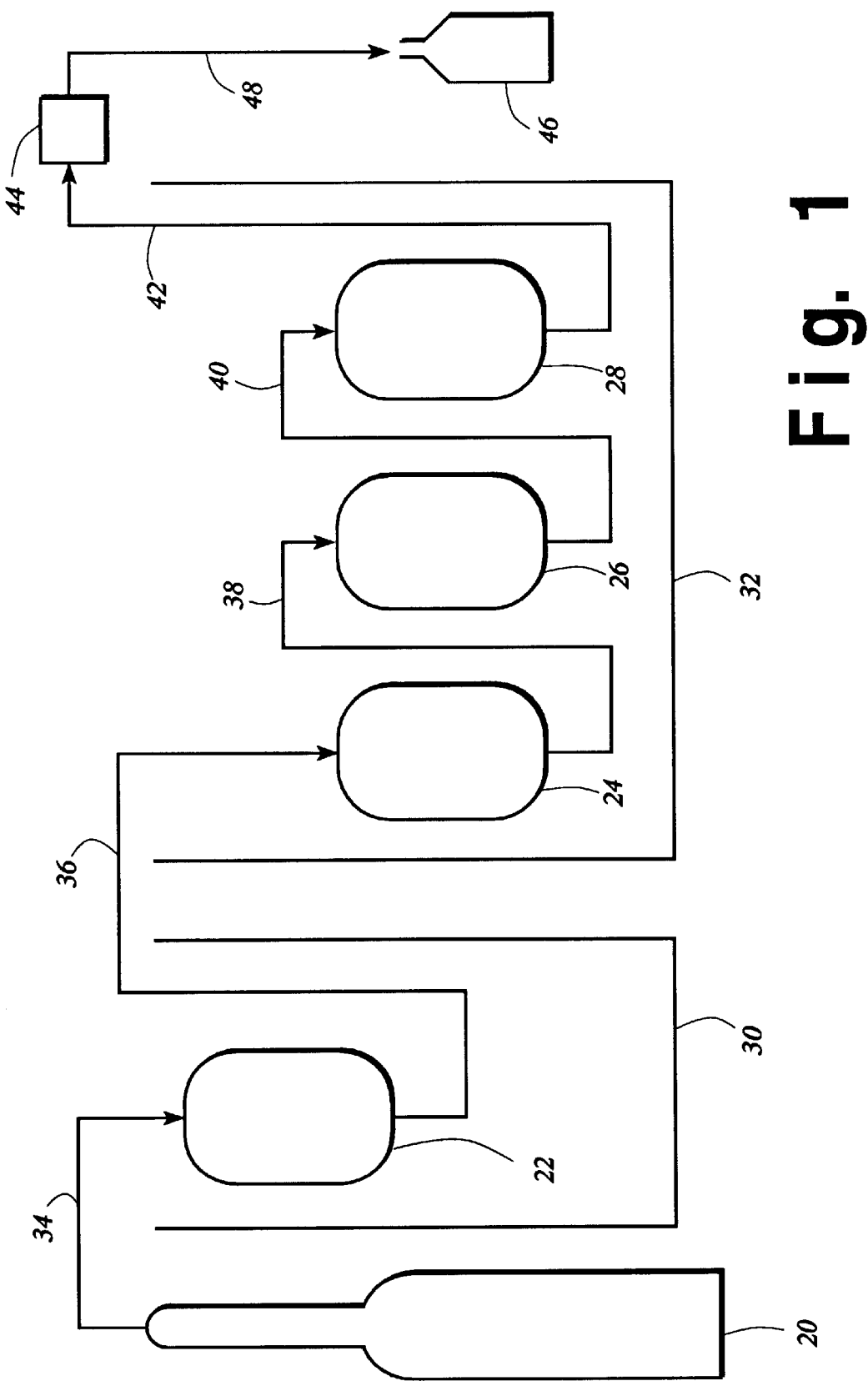

This invention is generally related to purifying a gas, and more specifically, this invention relates to purifying hexafluoroethane gas which contains non-volatile residues when it is stored and distributed from certain steel or aluminum cylinders.

BACKGROUND OF THE INVENTION

Hexafluoroethane, $C_2H_6$, is an etchant material used in the fabrication of semiconductor devices. If hexafluoroethane contains impurities including non-volatile residues ("NVR") it will likely deposit in certain process regulators, filters, lines and chambers after the system, and the pressure may reduce to near atmospheric pressure. NVR, an undesired impurity, may be present in the form of heavy hydrocarbon or fluorocarbon oils or solids from the hexafluoroethane that is near its critical temperature (19.7° C.) and critical pressure (29.8 bar or 432.1 pounds per square inch), This deposit may cause component failure or may contaminate the semiconductor devices during fabrication.

Generally, hexafluoroethane is packaged in both aluminum and steel cylinders, and the NVR impurities are different in each of these types of containers. It is believed that a major source of NVR contaminants is from lubricants used to insert the valve into the cylinder. It is also believed that the impurities in the aluminum cylinders are from mostly fluorocarbon oils or solids, whereas the impurities in the steel cylinders are from mostly hydrocarbon oils or solids.

If the NVR levels exceed a concentration of approximately 50 parts per billion (by weight), it must be purified to a concentration below that threshold before it can be used by a customer.

Various materials presently available for removing impurities at the specific temperature and pressure of interest, including coalescing oil filters, charcoal beds, 3A, 4A, 5A, 13X molecular sieve beds, alumina beds, silica gel beds, glass wool filters, borosilicate glass filters and fiberglass filters were made, but were unsuccessful in removing impurities. None of these approaches remove NVR by themselves at the temperature and pressure of interest. In general the gas will actually contain more NVR after the use of these materials. This is because hexafluoroethane acts as a solvent and dissolves materials off the bed's surface.

Pressure reduction, filtration and recompression as well as distillation will remove NVR. However, these approaches are not at the temperature and pressure of interest and are very expensive to perform, especially for a small number of cylinders.

There is believed to be no prior art that teaches or suggests the removal of NVR from hexafluoroethane from near its critical point.

U.S. Pat. No. 4,881,953 describes the use of a bed of activated carbon to remove heavy hydrocarbons from a gas stream. This approach did not work for hexafluoroethane.

J. A. Brink Jr. et al, in "Mist Removal from Compressed Gases", Chem. Eng. Prog. 62(4), 60 (1966) describes the use of fiber elements in a coalescing style filter housing. The main discussion is on the removal of oil from compressed air at a pressure of up to 5,500 psig. This type of oil removal approach does not appear to be successful for hexafluoroethane. U.S. Pat. No. 3,997,303 discloses a liquid-gas phase separator having a perforated plate and mist eliminator pad. U.S. Pat. No. 3,802,160 discloses an aerosol coalescing filter. U.S. Pat. No. 5,800,597 discloses an integrated coalesce filter-membrane device to provide a filtered gas employing stream and system employing such a device.

U.S. Pat. No. 3,972,694 discloses the construction of a filter tube from a mass of interrelated non-woven glass fibers.

U.S. Pat. No. 4,826,497 discloses a fibrous absorbent which enhances deodorizing properties. This patent describes the use of a crystalline siliceous molecular sieve of which 90 percent of the framework is silicon dioxide tetrahedra for the removal of organic body odors.

U.S. Pat. No. 4,934,148 to Prasad et al. discloses a dry, high purity nitrogen production process and system in which multiple bed series are used to remove water from a gas system.

There is therefore a need to provide a system, and a method for using such a system, in which a series of adsorption beds are used in specific sequences and at specific temperatures, and which is economically advantageous. When the correct sequence and conditions are used, the NVR will be removed from the hexafluoroethane that is at the temperature and pressure of interest. Since this process works at the pressure of interest, this invention requires no recompression or need for distillation. Accordingly, installation of this invention requires less capital and the operation cost is lower when compared to the present methods for purification of hexafluoroethane using pressure reduction/recompression or distillation.

SUMMARY OF THE INVENTION

An aspect of this invention is directed to a method and a system for purifying hexafluoroethane near its critical temperature and pressure in which the hexafluoroethane contains at least 1 ppb by weight of a non-volatile residue. This method comprises passing the hexafluoroethane to a sand trap bed held at less than about 19.7° C. to produce sand treated hexafluoroethane. Then the sand treated hexafluoroethane is passed to an adsorption bed assembly comprising a glass wool-molecular sieve-glass wool combination held at a temperature of greater than about 19.7° C., and at a pressure of from about 100 psig to about 2,000 psig to produce sand and adsorption bed treated hexafluoroethane. As used herein, "adsorption bed assembly" refers to a glass wool-molecular sieve-glass wool combination. The order for steps of passing through the sand trap bed and the adsorption bed assembly may be reversed. However, when the hexafluoroethane is passed through the sand trap bed as the last step, a filter is generally needed to remove undesired impurities.

In another embodiment, hexafluoroethane may be purified near its critical temperature and pressure by passing it through a sand trap bed alone, followed by filtering to remove undesired impurities.

Another aspect of this invention is a system for purifying hexafluoroethane near its critical temperature and pressure, wherein said hexafluoroethane contains at least 1 ppb by weight of a non-volatile residue. The system comprises a sand trap bed of fine granular consistency held at less than about 19.7° C.; and an adsorption bed assembly made up of a glass wool-molecular sieve bed combination held at a temperature of greater than about 19.7° C. in the following order comprising a first glass wool bed, a molecular sieve bed, and a second glass wool bed.

In still another embodiment, the system may comprise of a sand trap bed alone.

Various embodiments also provide for the use of either the sand trap bed or adsorption bed assembly individually.

DETAILED DESCRIPTION OF THE INVENTION

This invention provides a method and a system for purifying hexafluoroethane. One particularly desirable embodiment is provided in FIG. 1. In this embodiment, hexafluoroethane cylinder 20, typically aluminum or steel, contains the hexafluoroethane with greater than about 1 ppb, preferably 50 ppb (by weight) of a NVR. Sand trap bed 22, made of typically silicon dioxide or quartz, of "fine granular" consistency (as is known in the art) is held at from less than about 19.7° C., and preferably from about 10° C. to about 15° C., in temperature control bath 30. A set of glass wool beds 24 and 28 of "silanized standard consistency" (as is known in the art) is held in a temperature of greater than about 19.7° C., preferably from about 20° C. to about 25° C. A molecular sieve bed 26, for example a 13X molecular bed, was held at a temperature of greater than about 19.7° C., preferably from about 20° C. to about 25° C. Beds 24, 26 and 28 are located in a temperature control bath 32, held at a temperature of greater than about 19.7° C., preferably from about 20° C. to about 25° C.

A final purification step includes filter 44, for example, a filter of from about 0.05 micrometer to about 0.15 micrometer filter, preferably a 0.10 micrometer filter. Finally, receiving vessel 46 stores the purified hexafluoroethane that contains less than about 1 ppb, preferably less than about 50 ppb of NVR by weight.

Schematically, the beds are connected in one embodiment as shown in FIG. 1. Hexafluoroethane enters the top of sand trap bed 22 via line 34. The sand trap bed treated hexafluoroethane exits the bottom of sand trap bed 22 and enters the adsorption assembly. Hexafluoroethane is fed into the top of first glass wool bed 24 via line 36, exits the bottom thereof, then is fed into the top of molecular sieve bed 26, preferably a 13X molecular sieve bed via line 38, exits the bottom thereof, and then is fed into the top of second glass wool bed 28 via line 40, and exits the bottom thereof.

After the hexafluoroethane has been treated in the adsorption bed assembly, the sand trap bed and adsorption bed assembly treated hexafluoroethane enters filter 44 via line 42. The purified hexafluoroethane is then typically stored in container 46 via line 48.

In this embodiment, for a typical bed size of 400 cubic centimeters, the optimum flow rate is about 125 cubic centimeters per minute (at 21.1° C. and 1 atm pressure). This flow rate was measured after expansion (pressure reduction) to ambient conditions of the hexafluoroethane after filter 44.

The purpose of the sand trap is used to remove NVR from certain aluminum cylinders. The glass wool-13X molecular sieve-glass wool bed combination (adsorption bed assembly) is used to remove NVR from certain steel cylinders. The use of the combined bed systems (sand trap bed and the adsorption bed assembly) enables purification of both steel and aluminum cylinders. The filter was used to remove any undesired impurities, such as bed packing materials that may have been carried out through the bed arrangement.

The molecular sieve may be 3A molecular sieve beds, 4A molecular sieve beds, 5A molecular sieve beds, and 13X molecular sieve beds, and packed at a density of from about 0.60 g/ml to about 0.70 g/ml. Preferably, the molecular sieve is a 13X molecular sieve bed.

Generally, the given order of the sand trap and adsorption assembly is important, although the order may be interchanged. The temperature of the sand bed must be maintained in the range of from about 10° C. to about 15° C. This temperature range allows for some liquefaction of the hexafluoroethane. It is believed that the small amount of liquefaction enables fluorocarbon oils and solids to be deposited on the sand surface. If the temperature is too high, no liquefaction will take place and the trap will not remove the oils. If the temperature is too low, then too much liquefaction occurs and this washes the oils through the trap. Within the narrow temperature range as provided in this invention, the sand trap bed will remove the fluorocarbon NVR.

The sand trap bed is packed at a density of from about 1.70 g/ml to 1.75 g/ml, preferably 1.72 g/ml and conditioned at a temperature of greater than about 90° C., preferably from about 100° C. to about 150° C., with a flow of dry inert gas, preferably nitrogen (<1 ppm $H_2O$) for a minimum period of eight hours. The bed is conditioned to remove adsorbed water and NVR. If the bed is not conditioned, the NVR removal will be decreased and water will be introduced as a new contaminant in the hexafluoroethane.

The glass wool beds are packed at a density of from about 0.25 g/ml to about 0.30 g/ml, preferably 0.27 g/ml. The molecular sieve bed is packed at a density of from about 0.60 g/ml to about 0.70 g/ml, preferably 0.65 g/ml. The glass wool and molecular sieve bed sizes should be approximately equal. The glass wool bed and the molecular sieve bed, for example the 13X molecular sieve, are conditioned at above room temperature, and preferably at about 350° C., with a flow of dry inert gas, preferably nitrogen (<1 ppm $H_2O$) for a minimum of about 36 hours, preferably 48 hours. The purpose of the conditioning is to remove NVR that are already adsorbed on the bed surfaces. If the contamination is not removed, the capacity of the beds for removing NVR will be reduced.

In the case of the glass wool-molecular sieve-glass wool combination, the temperature range is also important. The temperature must be maintained above the critical temperature of 19.7° C. range to avoid liquefaction of the hexafluoroethane. If liquefaction occurs, the NVR removal may not occur as the liquefied gas will tend to extract as contaminants adsorbed on the bed surfaces. The optimal temperature range for this adsorption bed assembly for the removal of NVR from hexafluoroethane is greater than about 19.7° C., preferably between about 20° C. to about 25° C.

The least flexible section of the bed series for the removal of NVR is the adsorption bed assembly. In this invention, the sequence in the glass wool-molecular sieve-glass wool combination cannot be modified. Even a sieve trap with glass wool in the ends (just to hold the sieve in place) will not remove much NVR. However, such a sequence may remove some NVR. The glass wool beds should be about the same size as the molecular sieve bed, and packed to the density as specified above. It is believed that the first glass wool bed removes the high molecular weight hydrocarbons. The molecular sieve bed then removes the lower molecular weight hydrocarbons. The second glass wool bed is believed to remove particulates carried from the molecular sieve bed. The temperature for this adsorption bed combination must be held at greater than about 19.7° C., preferably from between about 20° C. to about 25° C. Lower temperatures allow liquefaction since the critical temperature of hexafluoroethane is 19.7° C. Liquefied hexafluoroethane will wash the hydrocarbon residues through the bed arrangement. Higher temperatures reduce NVR adsorption. The extreme case is conditioning temperatures specified above which is used to drive NVR from the bed.

If the hexafluoroethane that was stored and distributed from steel cylinders are to be purified, then only the adsorption bed assembly and the filter may be required. If the hexafluoroethane that was stored and distributed from aluminum cylinders are to be purified, then only the sand trap bed and the filter may be required.

The combined use of both the sand trap bed and the adsorption bed assembly was not found to improve the NVR removal for each cylinder type when compared to separate use of the beds (i.e., sand trap for removing NVR from aluminum cylinders and adsorption assembly for removing NVR from steel cylinders. It is believed that the NVR in the aluminum cylinder passes through the bed (adsorption bed assembly) that was meant for the NVR in the steel cylinders, and the NVR in the steel cylinder passes through the sand trap that was meant for NVR in the aluminum cylinders. The use of both the sand trap bed and the adsorption bed assembly is only for convenience, as it is not necessary to switch either sand trap bed and adsorption bed assembly if the cylinder type, either steel or aluminum, is changed.

Essentially, for steel cylinders, the invention uses a molecular sieve bed that has a glass wool packing at both ends and is held at any pressure and any temperature greater than about 19.7° C. More preferably, the adsorption bed assembly is made up of a glass wool-13X molecular sieve-glass wool combination held at any temperature greater than 19.7° C. Most preferably, the adsorption bed assembly is held at a pressure of between about 100 psig to about 2,000 psig, preferably between about 500 psig to about 600 psig, and a temperature of from between about 19.7° C. to about 25° C.

For the aluminum cylinders, the invention consists of a sand trap bed that is held at a temperature from between about 10° C. to about 15° C., and held at the vapor pressure of hexafluoroethane that corresponds to the bed temperature.

Simplistically, the most preferred embodiment is one which combines the sand trap bed and adsorption bed assembly in series as shown in FIG. 1.

Generally, the series of beds is run at cylinder pressure, at between about 100 psig to about 2,000 psig, preferably between about 500 psig and about 600 psig. A contaminated cylinder is simply connected to the series and opened to pressurize the system as above described. The gas that has passed through this system will have less than one percent of the starting level of NVR contamination, usually below 50 ppb, and even below 1 ppb, by weight in concentration. No pressure drop to near atmospheric and subsequent recompression is necessary.

Specific features of the invention are shown in the sole drawing for convenience only, as each feature may be combined with other features in accordance with the invention. Alternative embodiments will be recognized by those skilled in the art and are intended to be included within the scope of the claims.

What is claimed is:

1. A method for purifying hexafluoroethane near its critical temperature and pressure, wherein said hexafluoroethane contains at least about 1 ppb by weight of a non-volatile residue, said method comprising
   a) passing said hexafluoroethane to a sand trap bed held at less than about 19.7° C. to produce sand-treated hexafluoroethane; and then
   b) passing said sand treated hexafluoroethane to an adsorption bed assembly comprising a glass wool-molecular sieve-glass wool combination held at a temperature of greater than about 19.7° C., and at a pressure of from about 100 psig to about 2,000 psig to produce sand and adsorption bed treated hexafluoroethane.

2. The method of claim 1 which comprises passing said hexafluoroethane to said sand trap bed comprising silicon dioxide or quartz packed at a density of from about 1.70 g/ml to about 1.75 g/ml and conditioned at greater than about 90° C. with a flow of dry inert gas.

3. The method of claim 1 which comprises passing said hexafluoroethane to said adsorption bed assembly comprising glass wool beads packed at a density of from about 0.25 g/ml to about 0.30 g/ml, and molecular sieve bed packed at a density of from about 0.60 g/ml to about 0.70 g/ml, said bed assembly conditioned at greater than about room temperature with a flow of inert gas.

4. The method of claim 1 which further comprises passing said sand and adsorption bed treated hexafluoroethane through a filter.

5. The method of claim 1 which comprises passing said hexafluoroethane to said molecular sieve bed having separate glass wool packing on either side of said molecular sieve bed.

6. A method for purifying hexafluoroethane near its critical temperature and pressure, wherein said hexafluoroethane contains at least about 1 ppb by weight of a non-volatile residue, said method comprising
   a) passing said hexafluoroethane-to an adsorption bed assembly comprising a glass wool-molecular sieve-glass wool combination held at a temperature of greater than about 19.7° C., and at a pressure of from about 100 psig to about 2,000 psig to produce adsorption bed treated hexafluoroethane; and then
   b) passing said adsorption bed treated hexafluoroethane to a sand trap bed held at less than about 19.7° C. to produce adsorption bed and sand treated hexafluoroethane; and
   c) passing said adsorption bed and sand treated hexafluoroethane through a filter.

7. The method of claim 6 which comprises passing said hexafluoroethane to said sand trap bed comprising silicon dioxide or quartz packed at a density of from about 1.70 g/ml to about 1.75 g/ml and conditioned at greater than about 90° C. with a flow of dry inert gas.

8. The method of claim 6 which comprises passing said hexafluoroethane to said adsorption bed assembly comprising glass wool beads packed at a density of from about 0.25 g/ml to about 0.30 g/ml, and molecular sieve bed packed at a density of from about 0.60 g/ml to about 0.70 g/ml, said bed assembly conditioned at greater than about room temperature with a flow of inert gas.

9. A method for purifying hexafluoroethane near its critical temperature and pressure, wherein said hexafluoroethane contains at least about 1 ppb by weight of a non-volatile residue, said method comprising passing said hexafluoroethane to a sand trap bed at a temperature of up to about 19.7° C., and held at a vapor pressure of hexafluoroethane that is the same as said temperature, and then passing said hexafluoroethane through a filter.

10. The method of claim 9 which comprises passing said hexafluoroethane to said sand trap bed at from about −78.2° C. to about 19.7° C.

11. A system for purifying hexafluoroethane near its critical temperature and pressure, wherein said hexafluoroethane contains at least about 1 ppb by weight of a non-volatile residue, said system comprising a sand trap bed of fine granular consistency held at less than about 19.7° C.

12. The system of claim 11 further comprising a glass wool-molecular sieve bed combination held at a temperature of greater than about 19.7° C. and a pressure of from about 100 psig to about 2,000 psig in the following order comprising 1) a first glass wool bed;
2) a molecular sieve bed; and
3) a second glass wool bed.

13. The system of claim 12 wherein said first and second glass wool are comprised of silanized standard consistency, and are packed at a density of from about 0.25 g/ml to about 0.30 g/ml.

14. The system of claim 12 wherein said molecular sieve is from 13X molecular sieve beds, and packed at a density of from about 0.60 g/ml to about 0.70 g/ml.

15. The system of claim 12 further comprising a filter to remove impurities.

16. The system of claim 11 wherein said sand trap bed comprises silicon dioxide or quartz, and is packed at a density of from about 1.70 g/ml to about 1.75 g/ml and conditioned at greater than about 90° C. with a flow of dry inert gas.

17. The system of claim 11 further comprising a filter to remove impurities.

18. The system of claim 17 wherein said filter comprises a size of from about 0.05 micrometer to about 0.15 micrometer.

* * * * *